ical Patent [19] [11] 3,844,138
Samiran et al. [45] Oct. 29, 1974

[54] CONNECTING DEVICE

[76] Inventors: David Samiran, 148 Northwest Rd.;
Arthur H. Moore, 46 Northwest
Rd., both of Westfield, Mass. 01085

[22] Filed: Jan. 24, 1973

[21] Appl. No.: 326,373

[52] U.S. Cl. ................ 64/30 E, 64/15 C, 64/27 C,
74/459, 192/41 S, 188/83
[51] Int. Cl. .............................................. F16d 7/02
[58] Field of Search .......... 64/15 C, 15 R, 30 E, 23,
64/27 F, 27 C, 27 CT, 27 R; 192/41 S;
188/83, 67; 74/459, 424.8 R

[56] References Cited
UNITED STATES PATENTS

| | | | |
|---|---|---|---|
| 2,209,774 | 7/1940 | Hucbsch | 64/30 E |
| 2,415,497 | 2/1947 | Johnson | 188/83 |
| 3,277,736 | 10/1966 | Goodman | 74/459 |
| 3,402,574 | 9/1968 | Hauptman | 64/30 E |
| 3,521,633 | 7/1970 | Yahner | 188/83 |
| 3,602,340 | 8/1971 | Budzich et al. | 188/67 |

*Primary Examiner*—Benjamin W. Wyche
*Assistant Examiner*—Randall Heald
*Attorney, Agent, or Firm*—Albert L. Jeffers; Roger M. Rickert

[57] ABSTRACT

A connecting device for interconnecting two members in which a connector element on one member resiliently engages the other member and is operable for transmitting torque between the members. The connector element consists of one or more convolutions of, for example, wire, with free ends and at at least one circumferential point of the connector element is connected to the member which supports the connector element. The arrangement tends to retain the members in a predetermined axial position while preventing rotation between the members in at least one direction.

7 Claims, 14 Drawing Figures

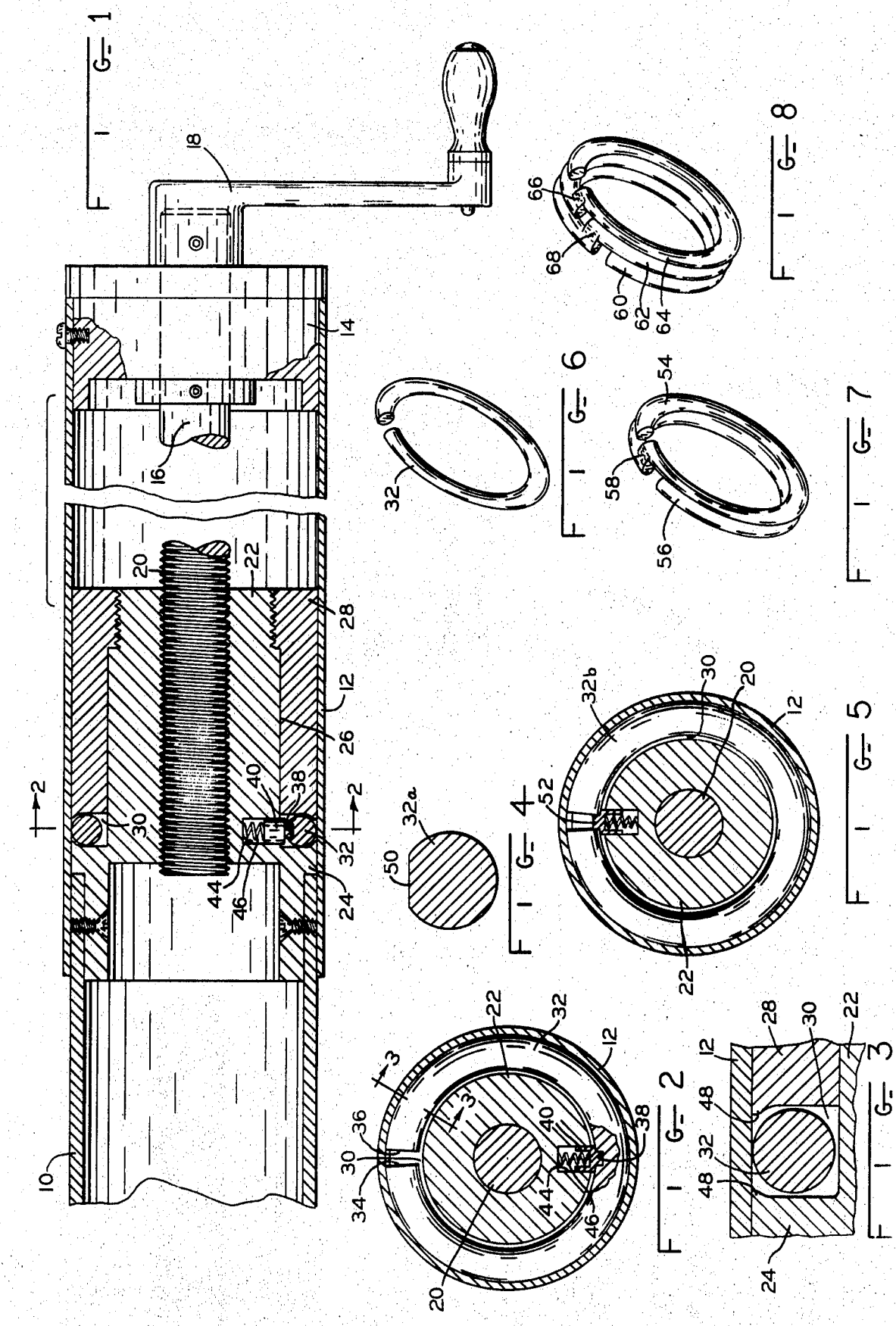

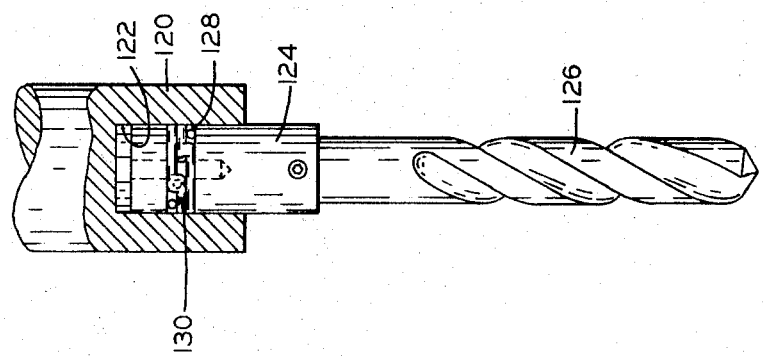
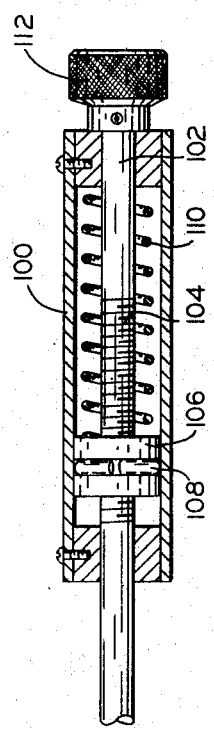
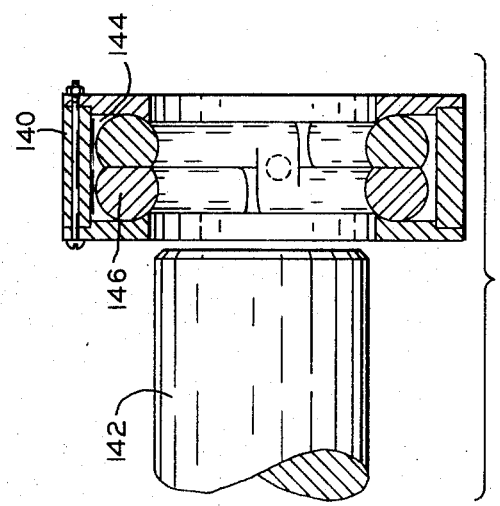
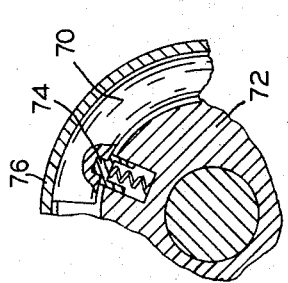
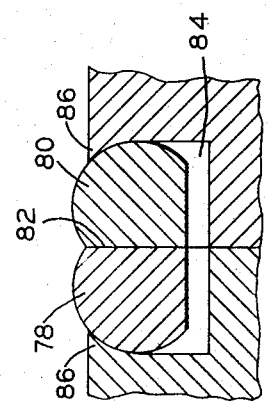
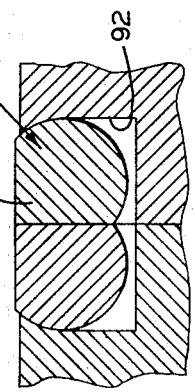

CONNECTING DEVICE

The present invention relates to a connecting device and is particularly concerned with a connecting device for interconnecting two telescopically engaged members for the transmission of torque therebetween.

There are many instances in which a pair of members which are in telescopic engagement are required to have torque transmitted therebetween. The transmission of torque may be required for the purpose of driving a member, such as a working tool, or for preventing a member from rotating such as a nut mounted on a threaded spindle. Many arrangements are possible for providing for the transmission of torque between members but most of the arrangements are expensive and require special machining of the members and which may weaken the machined member.

A primary object of the present invention is the provision of a relatively simple arrangement adapted to be interposed between a pair of members and operable for transmitting torque therebetween.

Another object of the present invention is the provision of a connecting device capable of transmitting torque between a pair of members in which the connecting device is relatively simple to apply to the members and is relatively inexpensive.

Another object of the present invention is the provision of a connecing device capable of transmitting torque between a pair of members in which the connecting device can be provided with a minimum of machining of the members.

Another object of the present invention is the provision of a connecting device capable of transmitting torque between a pair of members in which the connecting device can be arranged to transmit torque between the members in either one or both directions of rotation.

These and other objects and advantages of the present invention will become more apparent upon reference to the following detailed specification taken in connection with the accompanying drawings in which:

FIG. 1 is a longitudinal section through a device employing a connecting device according to the present invention.

FIG. 2 is a transverse section through the device of FIG. 1 and is indicated by line II—II on FIG. 1.

FIG. 3 is a section indicated by line III—III on FIG. 2 and drawn at enlarged scale.

FIG. 4 is a sectional view showing a modification of the connector element.

FIG. 5 is a view like FIG. 2 but shows a modification of the device.

FIGS. 6, 7 and 8 show different types of connector elements that can be used with the device of the present invention.

FIG. 9 is a fragmentary view similar to FIGS. 2 and 5 but showing a modification.

FIG. 10 is a sectional view showing a modified form which the connector element can take.

FIG. 11 is a view like FIG. 10 but shows another form which the connector element can take.

FIG. 12 is a sectional view showing the device of the present invention employed for affecting adjustment of a spring abutment.

FIG. 13 shows the connecting device of the present invention employed for supporting a working tool such as a drill.

FIG. 14 is a sectional view showing the connecting device of the present invention in inverted form.

BRIEF SUMMARY OF THE INVENTION

According to the present invention, a pair of members which are in telescopic engagement are provided with connecting means so that torque can be transmitted from one member to the other. The connecting device according to the present invention comprises a connector element in the form of a resilient annular member having one or more convolutions with the extreme ends of the connector element free.

The connector element is disposed in a groove in one of the members and has one radial side exposed which forms an interference fit with the other member and frictionally engages the other member so that when the members are placed into telescopic engagement, the connector element is resiliently deformed. The connector element is thus held in frictional engagement with the other member.

At least one point on the connector element is nonrotatably connected with the grooved member which supports it and, when the members tend to rotate relatively, the region of the connector element between the point which is connected to the one member and the free ends thereof will tend either to expand or contract thereby either permitting, or preventing, relative rotation between the members.

As will be seen, relative rotation between the members can be prevented in both directions and the connector element, in that case, holds the members nonrotatably together while permitting relative movement therebetween in the telescoping direction of the members.

DETAILED DESCRIPTION OF THE INVENTION

Referring to the drawings somewhat more in detail, in FIG. 1, a first tubular element 10 is arranged in telescopic engagement with a second tubular element 12 and the members are relatively moveable in the axial direction. Member 12 has an end member 14 mounted therein which rotatably supports one end of a spindle 16 to which is connected a crank 18. The spindle is rotatable in member 14 but is held therein against axial movement. Similarly, end member 14 is fixed in the end of member 12.

Spindle 16 has threads thereon at 20 and these threads engage a nut 22. Nut 22 at one end is connected to member 10 and includes an annular enlarged diameter portion 24 relatively closely fitting inside member 12. Between portion 24 of nut 22 and the end of the nut nearest member 14, the nut is reduced in diameter as at 26 and mounted thereon is a sleeve 28 which fits relatively closely inside member 12. The end of sleeve 28 is spaced from enlarged diameter portion 24 to form an annular groove or recess 30 in which is mounted a connector element in the form of an annular spring member 32. The free diameter of spring member 32 is at least slightly greater than the internal diameter of member 12 so that the spring ring is in compressed condition when it is inside member 12.

The inside of member 12 is smoothly cylindrical but frictionally engages the radially outer side of connector element 32.

As will be seen in FIG. 2, connector element 32 has its ends 34 and 36 free of each other and in circumferentially spaced relation and diametrically opposite thereto, element 32 is formed with a notch 38 which is engaged by the end of a plunger 40 mounted in a bore 44 formed in nut 22 and spring urged radially outwardly in the bore by a spring 46.

In operation, nut 22 is relatively freely moveable in the axial direction in member 12 and this will cause axial movement of member 10 relative to member 12. The axial movement of nut 22 is accomplished by rotation of threaded spindle 20. When spindle 20 rotates, nut 22 will be held against rotation in member 12 by connector element 32 because any tendency for nut 22 to rotate in member 12 will be accompanied by expansion of connector element 32 on one side of plunger 40 into tight frictional engagement with the inside of member 12. The nut 22 is thus held against rotation in either direction in member 12 but is relatively free to move therein in the axial direction.

FIG. 3 shows more in detail the manner in which connector element 32 is held on nut 22 in the annular recess 30 formed by sleeve 28 and portion 24 of nut 22. This recess will be seen to have annular lips 48 at the open side of the recess which confine an axial distance therebetween substantially less than the diameter of connector element 32 so that element 32 is prevented from becoming dislodged from the recess and it is also held therein in a prestressed condition such that no problems are encountered in introducing the spring element axially into member 12.

As will be seen in FIG. 4, which is a cross section through a connector element 32a, the radially outer side of the connector element can be flattened as at 50 thereby to provide for greater area of engagement between the element and the inside of member 12 thereby to increase the holding power with which the element grips the inside of member 12.

At this point, it will be appreciated that member 12 is smoothly finished inside so that no threads of keyways or other means need be provided for preventing rotation of the nut therein. The organization is relatively simple and inexpensive but is, nevertheless, highly effective for holding the nut 22 and the member 12 against rotation relative to each other.

A modification of the described arrangement is illustrated in FIG. 5 wherein an annular connector element 32b is provided in the annular recess 30 and which is held against rotation on nut 22 by a spring plunger 52 resiliently supported on the nut and interposed between the opposed ends of element 32b. Plunger 52, in this case, forms abutment means engaging the free ends of the connector element.

In the modification of FIG. 5, rotation of nut 22 relative to member 12 in either direction is prevented but, instead of only one-half of the resilient connector element being effective to prevent the said rotation, the entire length thereof is effective in each direction.

The annular connector element illustrated in FIGS. 1 to 5 consists of a single convolution. Such a connector element is indicated at 32 in FIG. 6. The connector element could, however, consist of more than one convolution and such elements are illustrated in FIGS. 7 and 8. In FIG. 7, the connector element illustrated has a first convolution 54 and a second convolution 56 with the convolution interconnected at one end as indicated at 58.

In FIG. 8, the connector element consists of three convolutions 60, 62 and 64 with interconnections between the convolutions shown at 66 and 68. With arrangements of the type illustrated in FIGS. 7 and 8, the connection between the connecting element and the member supporting the connecting element can be disposed at either free end of the connecting element or at an intermediate point along the element.

In this manner, the connector element can prevent rotation between the members which it connects in one or both rotations and can even provide for transmission of torque in one direction in a greater amount than in the other direction. For example, if the connector element shown in FIG. 8 has the connecting point at 66 attached to the supporting member, a greater amount of torque can be transmitted between the members in one direction of rotation than the other direction.

In any of the multiple convolutions connector elements the connection between the connector element and the supporting member therefor can take the form of abutment means on the supporting member engaging the free ends of the connector element.

FIG. 9 shows an arrangement wherein one end of an annular connector element 70 is attached to the supporting member 72 at one end of the connector element, as by the spring loaded plunger 74. In this arrangement, supporting member 72 is held against rotation relative to the outer member 76 in the clockwise direction, as viewed in FIG. 9, while relatively free rotation between the members 72 and 76 is possible in the counterclockwise direction.

When a two convolution connector element is employed, or when two connector elements of a single convolution each are employed, they can be arranged as shown in FIG. 10, wherein the convolutions 78 and 80 are provided with flats 82 on the sides toward each other and are confined within an annular recess 84.

This arrangement permits the connector element to be installed in a relatively short axial space. The members defining recess 84 are provided with lip means 86 which confine convolutions 78 and 80 so that they project only a sufficient radial distance outwardly from the supporting member to come into firm bearing engagement with the member into which they fit when the two members are telescopically engaged.

FIG. 11 shows an arrangement similar to that of FIG. 10 except that the connector element, generally designated at 90, has the side thereof which faces outwardly from the confining groove 92 machined off to substantially a cylindrical contour as indicated at 94. Similarly to the modification of FIG. 4, this substantially increases the area of contact between the connector element and the member which it is frictionally to engage.

In FIG. 12, an outer member 100 has a plunger 102 reciprocably mounted therein. Plunger 102 is threaded at 104 and threadedly engages a nut 106 having a connector element 108 according to the present invention mounted thereon and frictionally engaging the inside of member 100. A spring 110 bears between nut 106 and member 100 and biases plunger 102 toward the left. The bias of spring 110 can readily be changed by availing of knob 112 mounted on the end of plunger 102. Knob 112 also serves as a stop to limit the leftward movement of plunger 102 in member 100.

In FIG. 13, reference numeral 120 represents a spindle having a cylindrical bore 122 extending therein and adapted telescopically to receive a holder 124 adapted for receiving a rotary tool such as drill 126.

Holder 124 has an annular groove 128 therein and mounted in the groove is a connector element 130 according to the present invention. At least one point of the connector element 130 is held against rotation relative to holder 124 and rotation of spindle 120 is thus operable for transmitting torque through the connector element into the holder. At the same time, the holder 124 can be removed from the bore in the spindle by applying sufficient axial force to the holder.

All of the modifications previously described and illustrate the groove opening radially outwardly, but it is also possible for the groove to be formed so as to open radially inwardly. This is shown in FIG. 14 in which the member having the groove therein is indicated at 140 and the member in which it is telescopically to engage being indicated at 142. Member 142 is in the form of a shaft or a cylindrical tool shank or the like.

Member 140 has annular groove 144 therein in which connector element 146 is disposed and which, in the free state, has an internal diameter smaller than that of member 142 so that when member 142 is telescopically engaged with member 140, connector element 146 will be radially stressed and will, therefore, frictionally engage the surface of member 142.

As in connection with the other modifications, at least one circumferential point of connector element 146 is held against rotation relative to member 140 so that torque can be transmitted between members 140 and 142 via connector element 146.

The connecting device according to the present invention will axially restrain the telescoping members to a degree and is operable to transmit torque therebetween.

Depending on the location of the point of connection is the connector element to the member which supports it, the torque can be transmitted in one direction only, or in both directions. Further, the maximum torque which can be transmitted in either direction can be controlled and can be made different in one direction than in the other.

What is claimed is:

1. In a connecting device for interconnecting a pair of telescopically engaged members in torque transmitting relation; first and second members adapted for telescopic engagement, one of said members having a smooth internal cylindrical surface and the other of said members having a smooth external cylindrical surface, said surfaces being opposed when said members are in telescopic engagement, an annular groove in the said surface of said first member and opening toward the said surface of said second member, a connector element having at least two split wire rings in adjacent coaxial relation, the terminal end of one ring when proceeding about the rings in one circumferential direction being fixed to the beginning end of the next adjacent ring, said connector element being disposed in said groove and having a free diameter such that the connector element is radially stressed by engagement with said surface of said second member when said members are disposed in telescopic engagement with said connector element within the range of axial overlap of said members, and means nonrotatably connecting at least one circumferential point of said connector element to said first member while leaving the remainder of the circumference of said connector element free, the side of said connector element which faces said second member frictionally engaging the said surface of said second member whereby torque exerted between said members in at least one direction will cause said connector element to bind on said second member and prevent relative rotation between said members.

2. A connecting device according to claim 1 in which said means includes a radial plunger in said first member having an end part extending into said groove, said connector element having a notch formed therein receiving said end part of said plunger.

3. A connecting device according to claim 2 in which said notch is about midway between the free ends of said connector element about the circumference of said connector element.

4. A connecting device according to claim 2 in which said said notch is near one of the free ends of said connector element.

5. A connecting device according to claim 2 in which said notch is circumferentially closer to one free end of said connector element than to the other free end thereof.

6. A connecting device according to claim 1 in which the mouth of said groove includes axial lip means which define therebetween an axial gap smaller in dimension than the axial dimension of said connector element, at least the axial ends of said connector element being convex toward said lip means and engaging said lip means when the connector element is not stressed by said second member.

7. A connecting device according to claim 2 which includes a spring in said first member biasing said plunger radially toward said second member.

* * * * *